Patented May 25, 1937

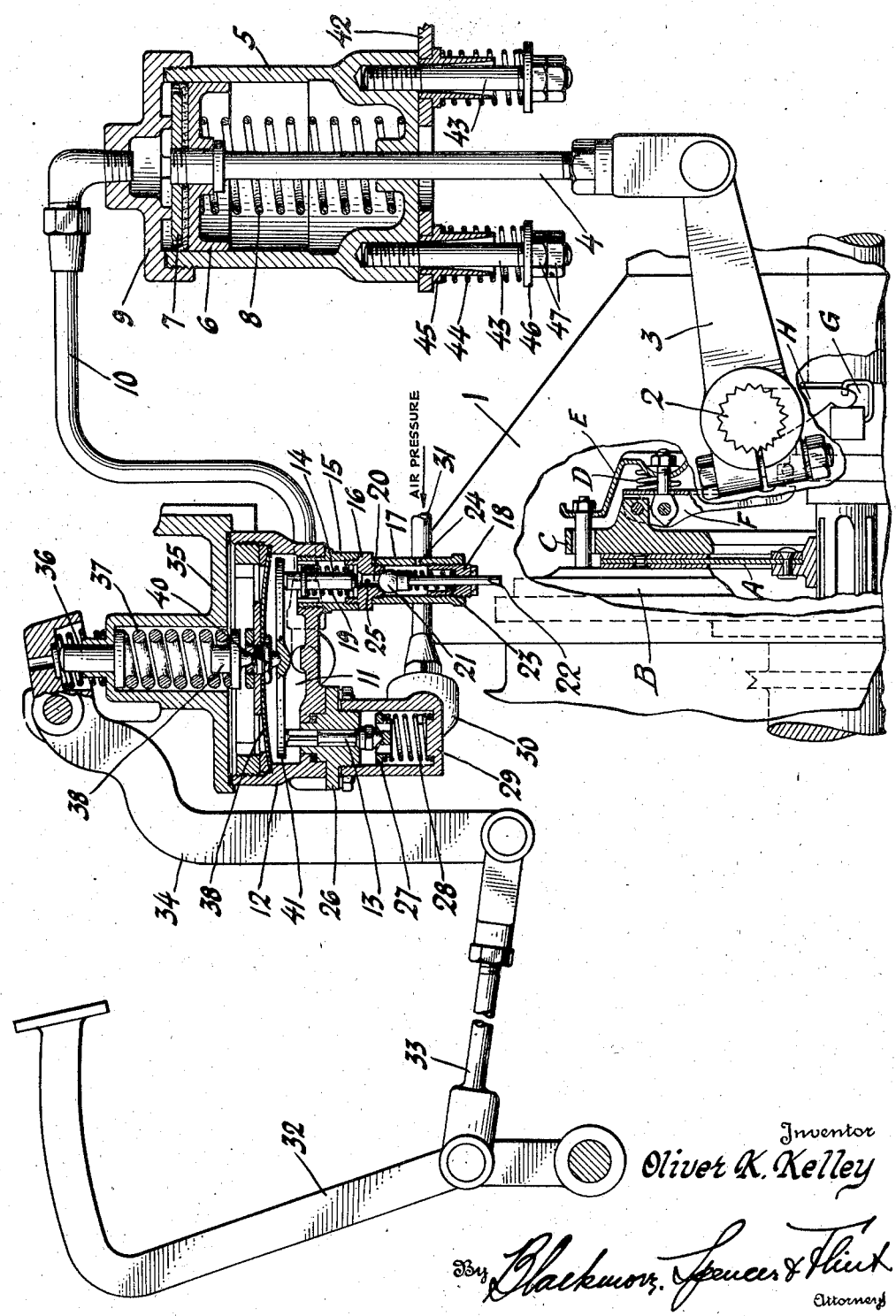

2,081,238

UNITED STATES PATENT OFFICE 2,081,238

CLUTCH CONTROL

Oliver K. Kelley, Pontiac, Mich., assignor, by mesne assignments, to Yellow Truck and Coach Manufacturing Company, Pontiac, Mich., a corporation of Maine Application September 30, 1935, Serial No. 42,810

6 Claims. (Cl. 192—91)

This invention relates to power systems for controlling the operation of the clutch which forms a part of the power plant for motor vehicles or the like.

The primary object of the invention is to obtain smooth clutch engagement. This can be accomplished by slight modifications in the existing conventional system in which air under pressure is supplied to a pressure responsive device connected with the clutch throwout mechanism.

In the conventional system, air under pressure is fed to a cylinder containing a movable piston to disengage the clutch parts against the resistance of the clutch springs. The springs restore driving engagement upon release of pressure but the sudden and complete release causes the clutch to grab. It is here proposed to provide for the gradual release of pressure to insure smooth reengagement of the clutch parts.

It is proposed also to eliminate jerking motion during reengagement, such as might occur because of a tendency of the piston to stick in the cylinder. This tendency is present due to the action of internal pressures on the piston packing. Where the packing is a leather cup, it is expanded against the cylinder wall by the air pressure for sealing purposes and on the down stroke it wipes the cylinder wall freely but on the up stroke the same expansion produces a binding effect. Should it stick momentarily during the exhaust, travel of the clutch parts is first retarded and then accelerated resulting in an objectionable jerking motion. In a construction in which piston drag on the cylinder wall is likely, there is contemplated the introduction of a resilient device to compensate for piston lag during the final portion of its travel without interfering with free travel of the clutch throwout mechanism. This feature may be incorporated in the system by mounting the cylinder for movement against elastic restraint in relation with the piston for a short distance sufficient to insure relative motion and a sliding friction between the cylinder and piston to keep the piston free, wherefore the cylinder returns to its normal position while the piston continues in its undisturbed inward motion.

For a better understanding of the invention reference may be made to the accompanying drawing illustrating, with parts in section, one embodiment of the improved clutch control mechanism.

In the drawing the numeral 1 indicates a fragment of the ordinary power plant housing which encloses the driving clutch, including a driven disc A interposed between the engine flywheel B and a movable pressure plate C. A series of circumferentially spaced coil springs, one of which is shown at D, are located between the pressure plate C and the cover E rigid with the flywheel B and serve to clamp the driven disc between the flywheel and pressure plate for the transmission of torque. Spaced throwout levers F fulcrumed on the cover E and pivoted at their outer ends to the pressure plate C have their inner ends arranged for engagement by an axially shiftable sleeve G surrounding the driven shaft and carrying an abutment for a rock lever H on the rockshaft 2. Clutch driving relation is broken upon the application of force to the throwout levers F to pull back the pressure plate C against the elastic force of the springs D. As the plate moves back the clamping of the driven disc A is gradually relieved allowing slippage of the friction surfaces and finally complete disengagement, the dimension of the parts being such that in the final limit of plate movement more than ample clearance is provided between the relatively rotating parts. This is necessary to insure maximum wear of the clutch facings. This clearance is taken up in the initial return movement of the pressure plate under influence of the clutch springs D and thereafter transmission of torque begins as the friction driving surfaces start to reengage and continued pressure plate movement increases the clamping action on the driven disc until the parts are pressed firmly together for their unisonal rotation.

The rock shaft 2 of the clutch throwout mechanism projects through the wall of the casing 1 and beyond the wall carries an actuating lever 3. Connected to the end of the lever 3 is a link 4 projecting through an end wall of a cylinder 5 and carrying a sliding piston 6, with which is associated a sealing cup 7 adapted to be pushed outwardly by internal pressure into sealing engagement with the wall of the cylinder 5. A return spring 8 is interposed between the bottom of the cylinder 5 and the piston 6. The end of the cylinder is closed by a cap 9 threaded thereon and connected by suitable fittings with a conduit 10 which is preferably flexible and communicates the interior of the piston cylinder with a chamber 11 in a valve casing 12. Associated with the casing 12 are spaced inlet and outlet valves 13 and 14, respectively, both of which terminate within the chamber 11 and project therefrom for engagement with valve seats formed in detachable fittings.

The fitting associated with the vent valve 14 includes a sleeve 15, a coupling 16, a sleeve 17 and a plug 18 arranged in end to end relation with a seat for the valve 14 formed on the coupling 16. A coil spring 19 enclosed within the sleeve 15 urges the valve away from its seat. Also closing the passage 20 and bearing on the end of the coupling opposite to that which seats the valve 14, is a ball valve 21 located by a headed guide pin 22 slidable in the plug 18. Interposed between the plug and the head of the stem 22 is a coil spring 23 for seating the valve 21 in opposition to air pressure thereon when the valve 14 is in the open position shown. Adjustment of the plug 18 threaded into the end of the sleeve 17 provides for variation in the tension of the spring 23 and, therefore, controls the setting of the valve 21 with regard to pressure required to unseat the same. Air passing the valve 21 reaches atmosphere through a port 24 in the side wall of the sleeve 17. A bleed hole 25 in the coupling 16 communicates the passageway 20 at all times with atmosphere regardless of the relative settings of the tandem related manually controlled valve 14 and the pressure controlled valve 21.

The stem of the inlet valve 13 projects through a fitting 26 and the head seats on the end of the fitting. Bearing on the head is a disc 27 to receive one end of a valve seating spring 28, the opposite end of which seats on the bottom of a cup 29 in threaded engagement with the fitting 26. The cup 29 has a lateral boss 30 leading to the interior thereof and being coupled to an air pressure line 31 communicating with a suitable source of air under pressure.

For controlling the opening and closing of the valves 13 and 14 manually and in proper relation there may be employed a foot lever 32 connected by a link 33 with an operating lever 34 pivoted to the mounting cap 35 for the casing 12. The movement of the lever 34 is transmitted through a tappet 36 projecting through an opening in the cap 35 and bearing on a coil spring 37 whose opposite end is seated on abutment 38 for engagement with a bearing shoe carried by a flexible diaphragm 39 which forms one wall of the chamber 11. Interiorly of the chamber the diaphragm is provided with a button 40 bearing on the middle of an equalizer lever 41, the opposite ends of which engage the ends of the two valves 13 and 14 for transmitting thereto the motion of the foot pedal 32.

As in the conventional structure, which is substantially that heretofore described except for the arrangement of the exhaust valve, disengagement of the clutch is effected whenever the operator depresses the foot pedal 32. This manual operation acts through the lever 41 to close the valve 14 and open the valve 13. Air under pressure is then free to flow through the lines 31 and 10 to the pressure cylinder 5 and moves the piston 6 downwardly to actuate the clutch throwout lever 3. The clutch returns to engaged position under the influence of its springs, upon release of the foot pedal 32 which closes the valve 13 and opens the exhaust valve 14 to relieve pressure within the cylinder 5.

As soon as the valve 14 is unseated a small portion of the air is free to bleed through the opening 25 to cushion the rush of air into the passageway 20 and the pressure, according to the predetermined calibration and setting of the spring 23 opens the valve 21 for the gradual release of pressure. The vent 25 being open at all times to the passageway 20 will continue to allow escape of air after the internal pressure has fallen to a value insufficient to overcome the resistance of the spring 23 thereby causing the final movement of the piston to slow down appreciably and effect smooth clutch engagement.

As the pressure is relieved the piston 6 moves upward in its cylinder. During such movement of the piston there may be instances arise, depending upon vehicle operating conditions, wherein internal pressure is sufficient to distend the sealing cup 7 to such extent that it binds momentarily on the cylinder wall. In order that this binding and subsequent release will not make uneven the movement of the arm 3 during clutch reengagement, the cylinder is mounted resiliently on its supporting plate 42. As a consequence of this resilient mounting the succeeding relative movement between the piston and cylinder will be a quick movement of the cylinder, and not of the piston and the arm 3 connected thereto. For this purpose the cylinder 5 has projecting therefrom two or more studs 43 passing through openings in the supporting plate 42 and being provided with holddown springs 44. Each spring 44 bears at one end against a guide sleeve 45 surrounding the stud and being fixed to the support 42 while the other end bears against a washer 46 held in place by a pair of nuts 47 threaded on the stud.

To explain the action in greater detail it may be said that the springs 44 exert slightly less force than the force of the clutch springs. Therefore, the application of pressure to the cylinder 9 will first lift the cylinder. If we assume that forty-five pounds per square inch air pressure is required to bottom the washers 46 against the sleeves 45, when the pressure exceeds forty-five pounds per square inch the piston starts down to disengage the clutch. The cylinder will remain lifted with the springs 44 compressed for the restoring tendency until after the pressure has been lowered below forty-five pounds per square inch.

On operating to engage the clutch the pressure in the cylinder is lowered; and when the clutch first begins to engage little or no torque is transmitted through the clutch; but the rate of translatory travel of the clutch pressure plate is diminished; consequently, piston travel slows down although venting of the cylinder continues with a consequent pressure drop in the cylinder. The pressure drop in the cylinder brings into action the restoring force of the springs 44 to move the cylinder downward in compensation for piston lag.

In other words, upon release of air pressure both the cylinder and the piston tend to be restored, the movement of the cylinder downward occurring upon a lag in piston movement upward when the relatively movable clutch parts start reengagement and thereby introduce resistance to the action of the clutch return springs and a diversion of a portion of the restoring force on the piston. The cylinder may be lifted again if at any time before complete clutch engagement the relative movement is so retarded that binding of the piston results.

Ordinarily binding and chatter are most likely to occur at the point when clutch driving engagement begins, since piston movement is considerably slowed down and even stops momentarily. Upon the occurrence of piston lag in a rigidly mounted cylinder the reduction in relative movement and the consequent presence of static friction introduces resistance to further relative movement until air pressure is greatly lowered and causes subsequent sudden freeing of the piston. The continued fall of pressure allows a momentarily accelerated piston movement until a new point of balance is established with a resultant jerky clutch action.

This condition of static friction is unlikely to occur with the present structure because, with the gradual reduction in air pressure as clutch engagement starts and piston movement slows down, the continuing pressure drop enables the springs 44 to pull the cylinder down until it finally comes to rest on the supporting bracket 42, when the venting of air pressure has approached a point where practically complete clutch engagement is obtained. In other words, as clutch engagement progresses from no torque to full torque the cylinder settles back to its supporting bracket with resulting constant sliding friction and gradual change of force on the clutch release bearing. Consequently, a smooth clutch application is attained.

However, should sticking occur toward the end of complete clutch engagement, the cylinder can move toward support 42 when a reduction of air pressure on the cup leather frees the piston. As the bond is broken, the cylinder and the piston move in opposite directions and the point of balance is established with a short range of piston travel, and without a harsh jerky action.

From the above it will be seen that with the venting of the cylinder, provision is made for substantially continuous relative motion of the piston and cylinder with the cylinder movement taking place as the piston movement slows down almost to a standstill. Continuous relative movement tends to eliminate static friction and produce a constant sliding action which reduces the tendency for the piston cup to stick and promotes smooth clutch engagement.

I claim:

1. In a fluid pressure clutch control system, a movable piston adapted for connection with clutch throwout mechanism, a cylinder containing said piston to receive air under pressure to move the piston for disengaging the clutch, and means to insure smooth reengagement of the clutch including a manually controlled pressure relief valve for exhausting the cylinder, a pressure operated valve arranged in tandem relation with said manually controlled valve and a resilient mounting for said cylinder to permit the cylinder a slight movement relative to the piston under elastic restraint.

2. In a fluid pressure clutch control system, a movable piston operatively connected with the clutch mechanism, a pressure cylinder containing said piston, means mounting the cylinder for movement relative to the piston and spring means constituting a part of said mounting means and acting in opposition to fluid pressure in movement of said cylinder.

3. In a fluid pressure clutch control system, a clutch throwout member, a movable piston having a motion transmitting connection with said member, a pressure cylinder containing said piston, a supporting connection for said cylinder, and yieldable means forming a part of one of said connections to promote sliding friction between the piston and cylinder as pressure is relieved during clutch engagement.

4. Pressure operated clutch control mechanism, including a piston connected with clutch throwout mechanism, a pressure cylinder slidably containing said piston, and a yieldable mounting for the cylinder so constructed and arranged as to offer resistance to cylinder movement upon application of air pressure, slightly less than the resistance to piston movement.

5. Pressure operated clutch control mechanism, including a piston connected with clutch throwout mechanism, a pressure cylinder slidably containing said piston, a support on which the cylinder is mounted for relative movement, spring means adapted to allow cylinder movement under influence of fluid pressure within the cylinder and to restore the cylinder as fluid pressure is relieved from promoting sliding friction between the piston and cylinder.

6. Pressure operated clutch control mechanism, including a piston connected with clutch throwout mechanism, a pressure cylinder slidably containing said piston, means allowing a limited movement of the cylinder upon the application of fluid pressure thereto and cylinder restoring means active upon a fluid pressure reduction when piston movement is retarded as the clutch begins to take up its load, to move the cylinder relative to the piston.

OLIVER K. KELLEY.